US010865668B2

(12) United States Patent
Wong (10) Patent No.: US 10,865,668 B2
(45) Date of Patent: Dec. 15, 2020

(54) FOUR-WAY HYDRAULIC VALVE FLOW CONTROL BODY

(71) Applicant: NIO USA, Inc., San Jose, CA (US)

(72) Inventor: Ming Fung Wong, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 161 days.

(21) Appl. No.: 15/802,651

(22) Filed: Nov. 3, 2017

(65) Prior Publication Data

US 2019/0136724 A1 May 9, 2019

(51) Int. Cl.
| | | |
|---|---|---|
| *F01L 7/02* | (2006.01) | |
| *B65G 53/46* | (2006.01) | |
| *F01L 7/16* | (2006.01) | |
| *F01L 7/18* | (2006.01) | |
| *F16K 5/08* | (2006.01) | |
| *F16K 11/085* | (2006.01) | |

(52) U.S. Cl.
CPC ............ *F01L 7/02* (2013.01); *B65G 53/4633* (2013.01); *F01L 7/16* (2013.01); *F01L 7/18* (2013.01); *F16K 5/08* (2013.01); *F16K 11/085* (2013.01)

(58) Field of Classification Search
CPC ...... F01L 7/02; F01L 7/16; F01L 7/18; B65G 53/4633; F16K 5/08; Y10T 137/86541; Y10T 137/86839
See application file for complete search history.

(56) References Cited

U.S. PATENT DOCUMENTS

| | | | | | |
|---|---|---|---|---|---|
| 5,529,028 | A | * | 6/1996 | Weikert | B60H 1/3208 123/198 R |
| 5,617,815 | A | * | 4/1997 | Spies | F16K 11/076 123/41.1 |
| 6,164,248 | A | * | 12/2000 | Lehmann | F01P 5/10 123/41.1 |
| 6,539,899 | B1 | * | 4/2003 | Piccirilli | F01P 7/167 123/41.08 |
| 6,688,333 | B2 | * | 2/2004 | McLane | B60H 1/00485 123/41.1 |
| 7,096,831 | B2 | * | 8/2006 | Finkbeiner | F01P 7/16 123/41.1 |
| 7,302,919 | B2 | * | 12/2007 | Vacca | B60H 1/00485 123/41.08 |
| 7,506,664 | B2 | * | 3/2009 | Norris | B60H 1/00485 137/625.17 |
| 8,347,831 | B2 | * | 1/2013 | Vacca | F16K 11/085 123/41.08 |
| 8,603,220 | B2 | | 12/2013 | Rarig et al. | |

(Continued)

OTHER PUBLICATIONS

U.S. Appl. No. 16/569,347, filed Sep. 12, 2019, Wong.

*Primary Examiner* — Kevin R Barss
(74) *Attorney, Agent, or Firm* — Sheridan Ross P.C.

(57) ABSTRACT

A valve comprising a rotor, the rotor comprising two passageways and two or more sealing faces. The valve allowing for controlling air flow between four directions. The valve can be capable of operating in a number of operation modes depending on a position of the rotor. The valve design can include a valve-housing with three ports in plane with a first plane and one port normal to the first plane. A rotary valve provides a plurality of predetermined flow modes between four ports. The valve comprises an outer layer and a rotatable inner layer. The inner layer allows for a number of different flow configurations between four ports.

20 Claims, 9 Drawing Sheets

(56) References Cited

U.S. PATENT DOCUMENTS

| | | | |
|---|---|---|---|
| 9,482,365 B2 | 11/2016 | Miller, III et al. | |
| 9,625,044 B2 | 4/2017 | Bjernulf et al. | |
| 9,945,283 B2 | 4/2018 | Muizelaar et al. | |
| 1,010,717 A1 | 10/2018 | Bowler et al. | |
| 2001/0035187 A1* | 11/2001 | Smith | A61M 16/20 128/205.24 |
| 2006/0237359 A1* | 10/2006 | Lin | B01D 24/4642 210/424 |
| 2010/0324466 A1* | 12/2010 | Chau | A61M 1/16 604/6.16 |
| 2016/0040585 A1 | 2/2016 | Schaefer | |
| 2017/0152957 A1* | 6/2017 | Roche | F16K 11/0853 |

* cited by examiner

FOUR-WAY HYDRAULIC VALVE FLOW CONTROL BODY

FIELD OF INVENTION

The present invention relates generally to directing flows and, more particularly, to an apparatus for efficiently directing flows of fluids in an electric vehicle.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Valves are devices that regulate, direct, and/or control the flow of a fluid such as a gas, liquid, fluidized solid, etc. While traditional valves may operate with two ports and allowed controlling a rate of flow through a single passageway, modern technology demands valves with a greater number of ports allowing for a plurality of configurations of flows.

Rotary valves may be used to direct flow to and from a number of peripheral ports spaced around the valve. Rotary valves may comprise a stator plate and a rotor plate. Typically, a rotor plate is maintained in fluid-tight contact with the stator plate and is operable to rotate within the stator. A flow may be established into one of the peripheral ports, through the rotor plate, and out of another peripheral port.

A modern electric vehicle requires flows of coolant throughout the vehicle. Maintaining flows throughout the vehicle requires a number of valves interconnected with a number of elements. What is needed is an apparatus capable of reducing the number of valves needed for efficient flow of fluid throughout a vehicle.

DETAILED DESCRIPTION

Figure 1:
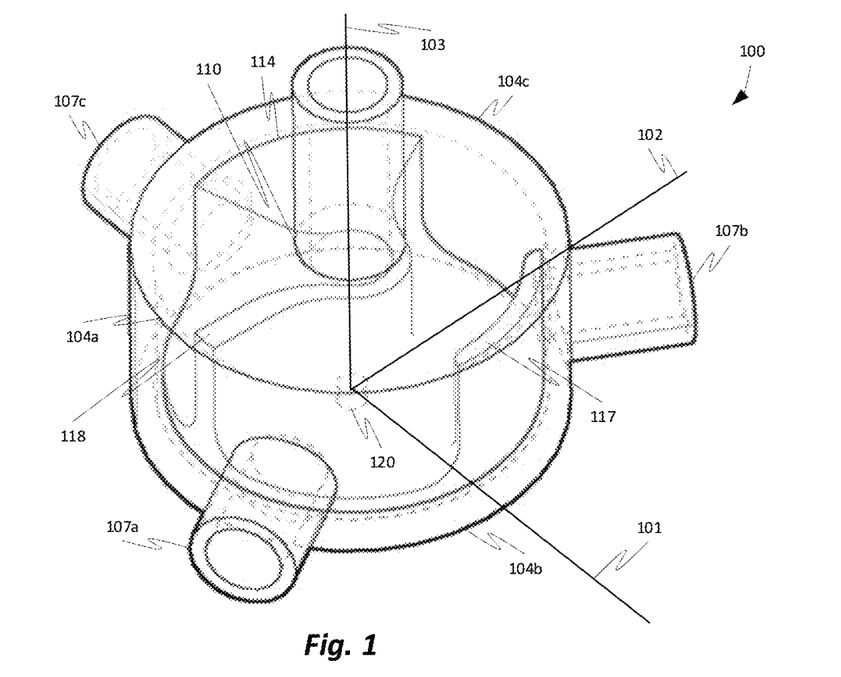
FIG. 1 is a perspective view of a valve in accordance with some embodiments of the invention.
Figure 2:
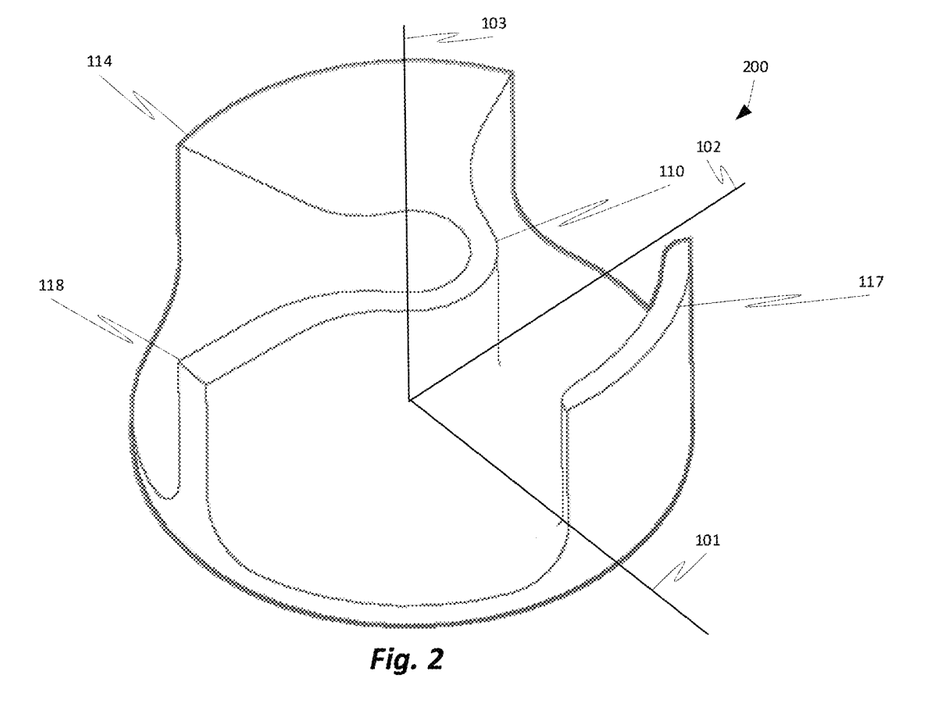
FIG. 2 is a perspective view of a valve in accordance with some embodiments of the invention.

As illustrated in FIG. 1, and in an alternative angle view in FIG. 2, a rotary valve 100 may comprise an outer wall 104*a-c* and a rotatable inner mechanism (114, 117, 118). For purposes of illustration, the valve 100 is shown on a three-dimensional axis, with an x-axis 101, a y-axis 102, and a vertical, or z, axis 103. The rotatable inner mechanism (114, 117, 118), may rotate around the vertical axis 103. The outer wall 104*a-c* may comprise three ports 107*a, b, c* facing horizontally outward from the center of the valve 100. The valve 100 may further comprise a fourth port 110 facing in a vertical direction at a ninety-degree angle from the three other ports 107*a, b, c*. Note that neither this figure or any other figure is necessarily drawn to scale and the dimensions of various elements and the interrelated position of various elements may vary in some embodiments.

Figure 3:
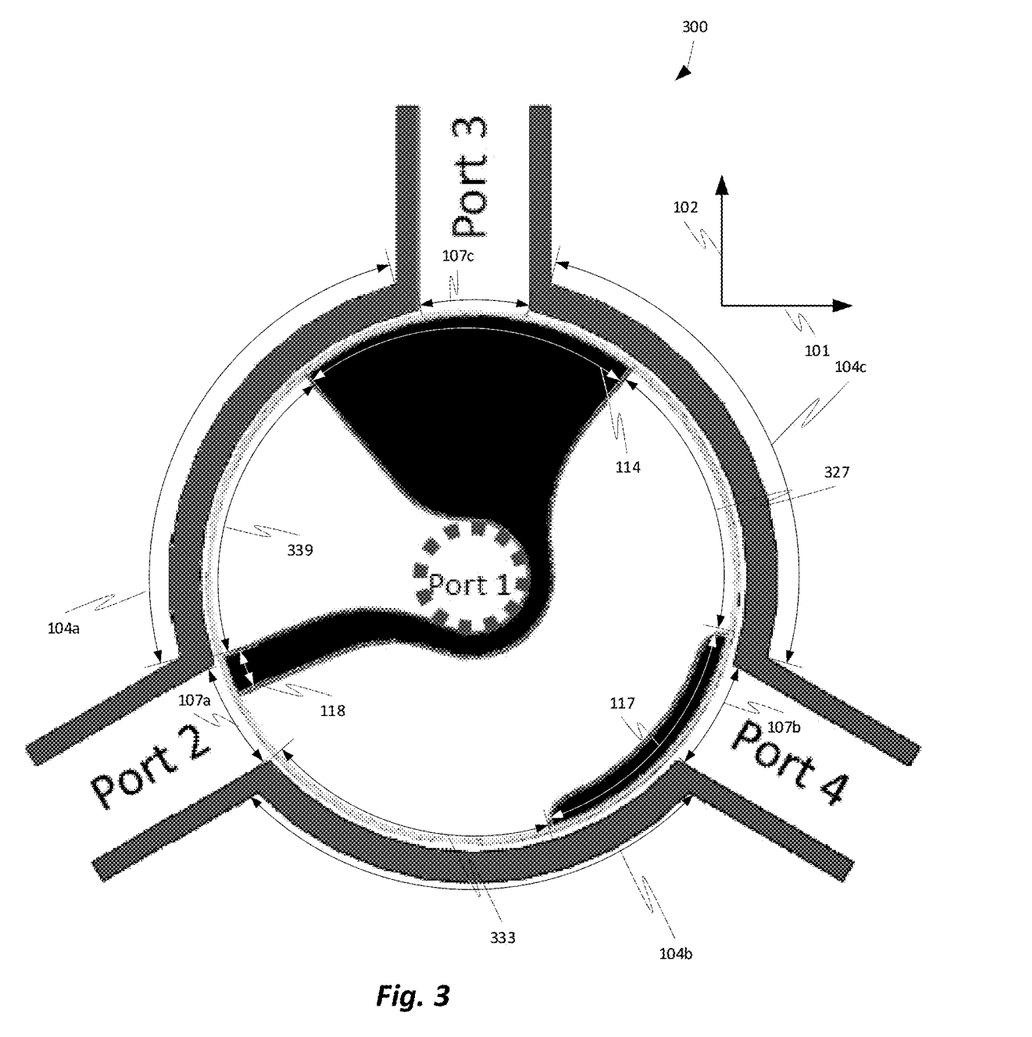
FIG. 3 is a top cross-sectional view of a valve in accordance with some embodiments of the invention.

The rotatable inner mechanism (114, 117, 118) of the rotary valve 100, may comprise three portions 114, 117, 118. The portions may be connected to each other via a top element and/or a bottom element. A top down perspective view is shown in FIG. 3.

As can be appreciated, a first portion 114 of the rotatable inner mechanism (114, 117, 118) may extend from an outer wall of the vertical port 110 toward an inner edge of the outer wall 104*a-c* of the rotary valve 100. As illustrated in FIG. 3, the portion 114 may cover around 80 degrees of the inner edge of the outer wall 104*a-c*. The portion 114 of the rotatable inner mechanism (114, 117, 118) may be connected to the outer wall of the vertical port 110 (Port 1 of FIG. 3).

A second portion 118 of the rotatable inner mechanism may also connect to the outer wall of the vertical port 110 and extend outward toward an inner edge of the outer wall 104*a-c* of the rotary valve 100. As illustrated in FIG. 3, the portion 118 may cover around 13 degrees of the inner edge of the outer wall 104*a-c*.

A third portion 117 of the rotatable inner mechanism (114, 117, 118) may be positioned along the outer wall 104*a-c* of the rotary valve 100. As illustrated in the figures, the third portion 117 may extend away from the outer wall 104*a-c* slightly while leaving an open area or gap between the outer wall of the vertical port 110. The third portion 117 may cover around 43 degrees of the inner edge of the outer wall 104*a-c*.

The first portion 114 and the second portion 118 may be separated by an open area or gap 339. Gap 339 may be connected to the vertical port 110 such that a fluid may be able to flow between gap 339 and the vertical port 110. The gap 339 may cover around 80 degrees of the inner edge of the outer wall 104*a-c* as illustrated in FIG. 3. Depending on a position of the rotatable inner mechanism (114, 117, 118), the gap 339 may allow air or fluid to pass to and from the vertical port 110 and one of the three horizontal ports 107*a-c*. For example, in the position shown in FIG. 3, The second portion 118 and the third portion 117 may be separated by an open area or gap 333. Gap 333 may cover around 64 degrees of the inner edge of the outer wall 104*a-c*. The third portion 117 and the first portion 114 may be separated by an open area or gap 327. Gap 327 may cover around 80 degrees of the inner edge of the outer wall 104*a-c*. Gaps 333 and 327 may be connected such that a passageway is formed in which fluid may be able to flow between the gaps 333 and 327. Depending on a position of the rotatable inner mechanism (114, 117, 118), each of gaps 333 and 327 may connect with a different one of ports 107*a, b, c* and the passageway connecting the gaps 333 and 327 may allow fluid to pass between those two ports.

The three ports 107*a-c* or openings may be positioned along the outer wall 104*a-c*. While the ports 107*a-c* in the figures appear to be circular in shape, in some embodiments the ports may be circular or any other shape.

The inner rotatable mechanism may be controlled by a servomotor controlled by a processor onboard the vehicle. The angular position of the inner rotatable mechanism may be determined by an angular position sensor. The servomotor may be connected to a shaft connected to the rotor at a junction 120.

Figure 16:
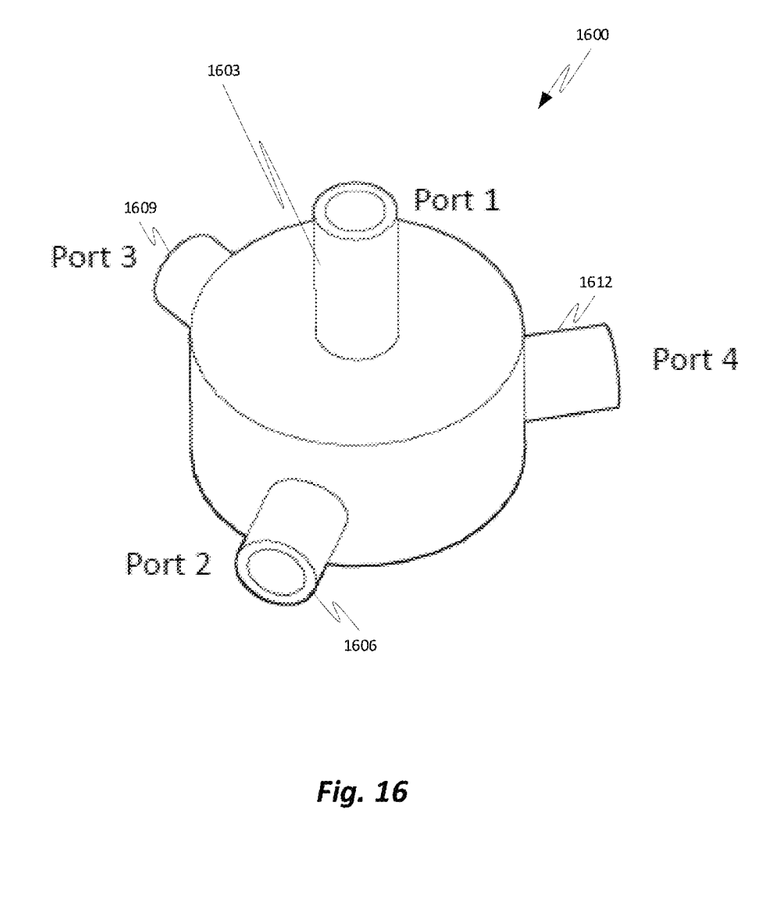
FIG. 16 is a perspective view of a valve housing in accordance with some embodiments of the invention.

While the figures show the rotary valve 100 to be open on the upper portion of the vertical axis, this is for illustration purposes only. The valve may be sealed by a housing, as illustrated in FIG. 16, such that air or fluid may pass only through the four ports. Air or fluids may be capable of passing between ports dependent on a position of the rotatable inner mechanism.

Depending on a position of the rotatable inner mechanism (114, 117, 118), fluid may be able to be passed between the ports via two interior passageways in a number of configurations. As illustrated in FIGS. 4A-J, various flow configurations may be enabled. In FIGS. 4A-J, [1] may represent the vertical port (Port 1 of FIG. 3), while [2] may represent Port 2 of FIG. 3, [3] may represent Port 3 of FIG. 3 and [4] may represent Port 4 of FIG. 3. Arrows between the ports may represent a flow while the T shape may represent a blocked port. As can be appreciated from FIGS. 4A-J, at least ten flow configurations may be achieved via the angular position of the rotatable inner mechanism of the valve. These configurations are illustrated in further detail below.

As explained herein, a first passageway 509 may always be connected to a vertical port 512 while a second passageway 515 may never connect to the vertical port 512. On an end of the first passageway 509 that is away from the vertical port 512 the first passageway 509 may comprise a first gap 524. The first gap 524 when aligned with one of the three horizontal ports 521, 527, 533 may allow for a flow of fluid from the vertical port 512 to the one of the three horizontal ports 521, 527, 533. A second passageway 515 may be a route running through the valve in a horizontal plane. The second passageway 515 may have two gaps 524, 530. The two gaps 524, 530 of the second passageway 515 may be capable of aligning with up to two of the three horizontal ports 521, 527, 533 depending on a rotational position of the rotatable inner rotor.

Figure 4A:
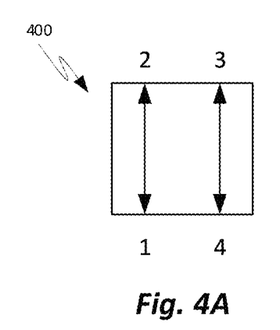
FIGS. 4A-J are mode diagrams in accordance with some embodiments of the invention.

The first passageway 509 and the second passageway 515 may be physically connected to each other by three solid portions 536, 539, 542. The three solid portions 536, 539, 542 may act as flow blockers and be capable of sealing off flow into/out of the three horizontal ports 521, 527, 533. The three solid portions 536, 539, 542 may comprise a first flow blocker 536, a second flow blocker 539, and a third flow blocker 542. As explained below, the first passageway 509, the second passageway 515, the first flow blocker 536, the second flow blocker 539, and the third flow blocker 542 may all be interconnected pieces of the inner rotatable rotor and may rotate together to switch flow into and out of the four ports As illustrated in FIG. 4A, in a first mode 400, the first port may be connected to the second port and the third port may be connected to the fourth port. This configuration is illustrated in a top down perspective view in FIG. 5. As can be appreciated from FIG. 5, the first mode 400 allows for two parallel flows, a first flow from port one to port two and a second flow from port three to port four. Flows between two ports should not be interpreted as being limited to being in a single direction. A statement that a flow is from a first port to a second port may also include the flow being from the second port to the first port.

Figure 5:
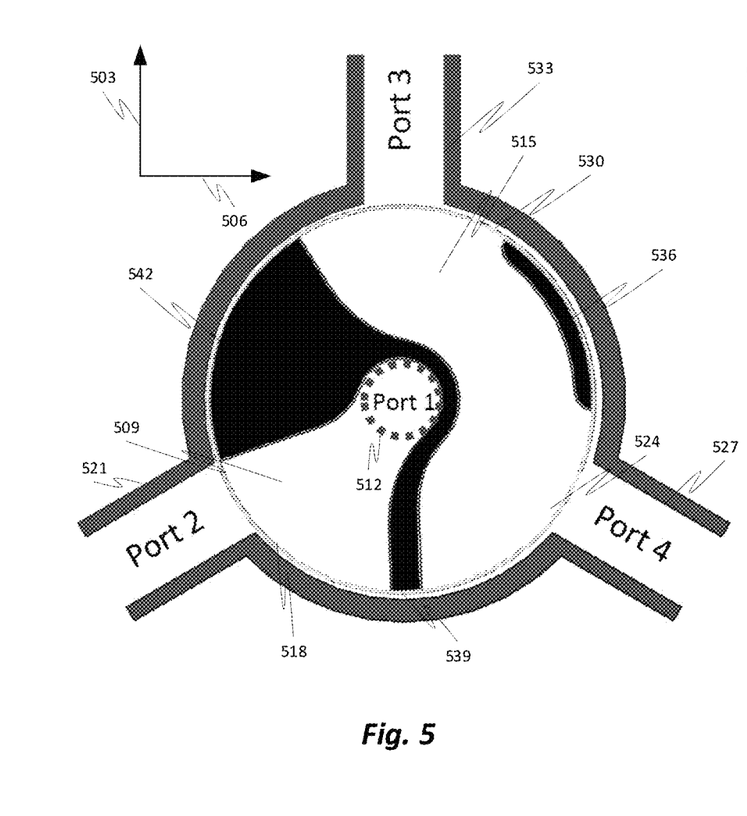
FIGS. 5-14 are top cross-sectional views of a valve in accordance with some embodiments of the invention.

In the embodiment illustrated in FIG. 5, the inner rotatable rotor is aligned to a rotational position such that the first passageway 509 is positioned such that the gap 518 of the first passageway 509 is aligned with the second port 521 while the second passageway 515 is positioned such that the first gap 524 of the second passageway 515 is aligned with the fourth port 527 and the second gap 530 of the second passageway 515 is aligned with the third port 533. With the inner rotatable rotor in such a position, a flow between the first port 512 and the second port 521 through the first passageway 509 and a flow between the third port 533 and the fourth port 527 through the second passageway 515 may be achieved.

Figure 4B:
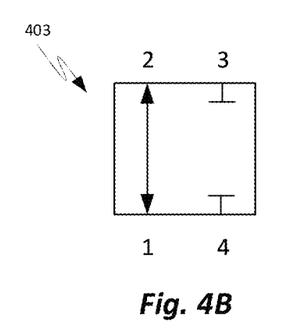

As illustrated in FIG. 4B, in a second mode 403, the first port may be connected to the second port and the third and fourth port may be blocked. This configuration is illustrated in FIG. 6.

Figure 6:
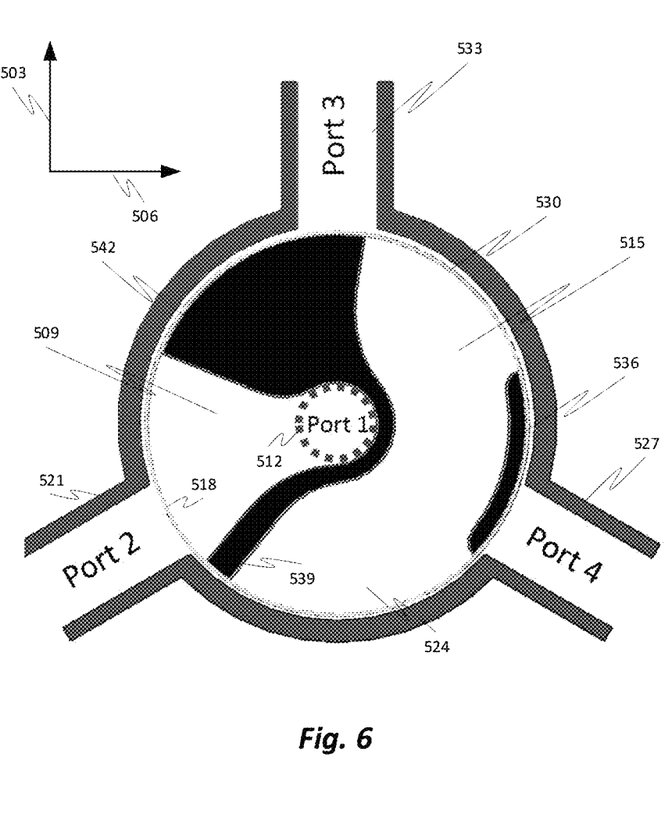

In the embodiment illustrated in FIG. 6, the inner rotatable rotor is aligned to a rotational position such that the first passageway 509 is positioned such that the gap 518 of the first passageway 509 is aligned with the second port 521 while the second passageway 515 is positioned such that the first gap 524 and the second gap 530 of the second passageway 515 are not aligned with any of the three horizontal ports 521, 527, 533. With the inner rotatable rotor in such a position, a flow between the first port 512 and the second port 521 through the first passageway 509 is achieved while flow to and from the third port 533 and flow to and from the fourth port 527 is blocked.

Figure 4C:
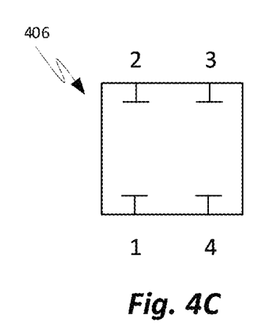

As illustrated in FIG. 4C, in a third mode 406, each of the four ports may be blocked such that no flow is allowed into or out of the valve. This configuration is illustrated in FIG. 7.

Figure 7:
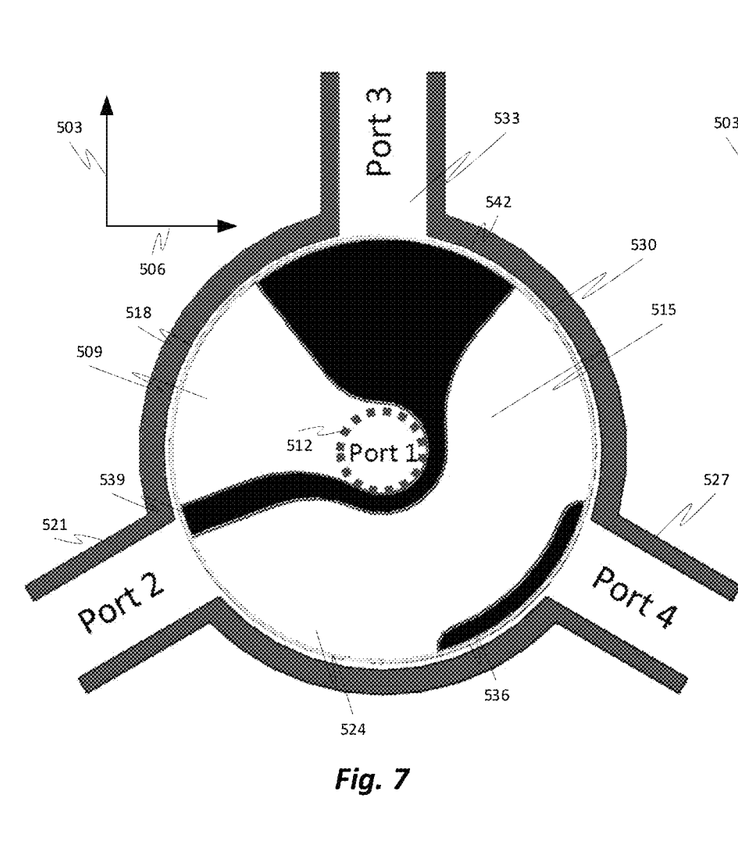

In the embodiment illustrated in FIG. 7, the inner rotatable rotor is aligned to a rotational position such that the first passageway 509 is positioned such that the gap 518 of the first passageway 509 is aligned with the inner wall of the valve between the second port 521 and the third port while the second passageway 515 is positioned such that the fourth port 527 is blocked. With the inner rotatable rotor in such a position, flow to and from the first port 512, second port 521, third port 533, and fourth port 527 is blocked.

Figure 4D:
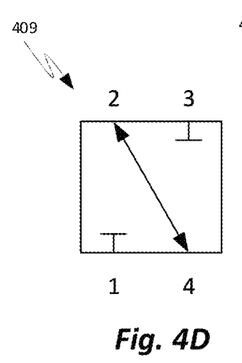

As illustrated in FIG. 4D, in a fourth mode 409, the first and third ports may be blocked, and the second port may be connected to the fourth port. This configuration is illustrated in FIG. 8.

Figure 8:
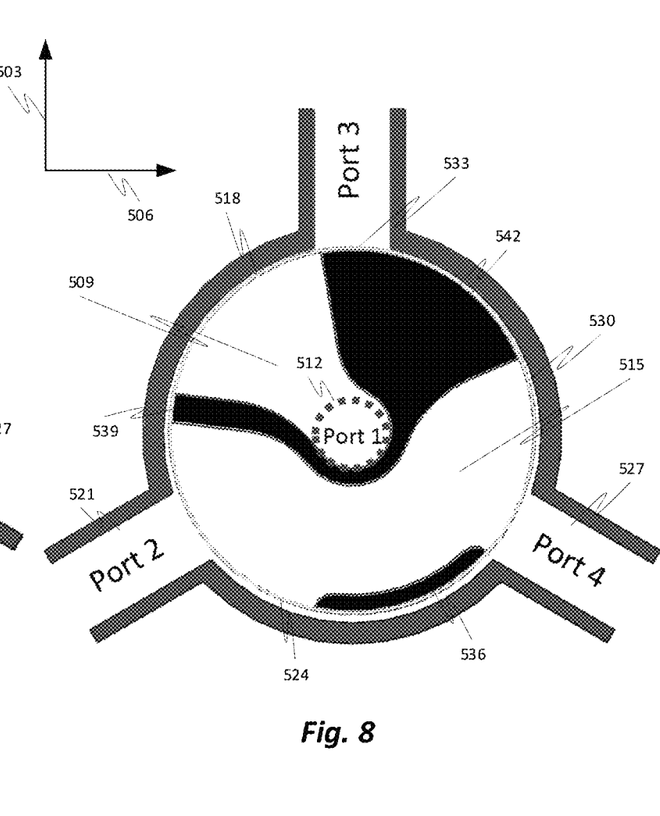

In the embodiment illustrated in FIG. 8, the inner rotatable rotor is aligned to a rotational position such that the first passageway 509 is positioned such that the gap 518 of the first passageway 509 is aligned with the inner wall of the valve between the second port 521 and the third port while the second passageway 515 is positioned such that the first gap 524 of the second passageway 515 is aligned with the second port 521 and the second gap 530 of the second passageway 515 is aligned with the fourth port 527. With the inner rotatable rotor in such a position, a flow to and from the first port 512 and to and from the third port 533 is blocked while flow between the second port 521 and the fourth port 527 through the second passageway 515 is achieved.

Figures 4E, 4F:
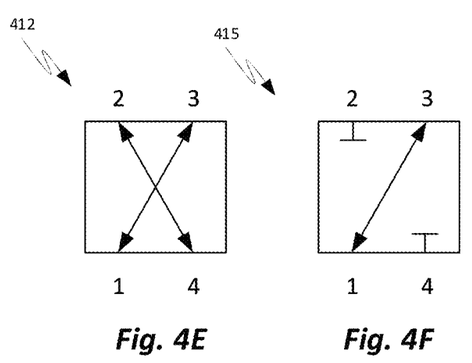

As illustrated in FIG. 4E, in a fifth mode 412, the first port may be connected to the third port and the second port may be connected to the fourth port. This configuration is illustrated in FIG. 9.

Figure 9:
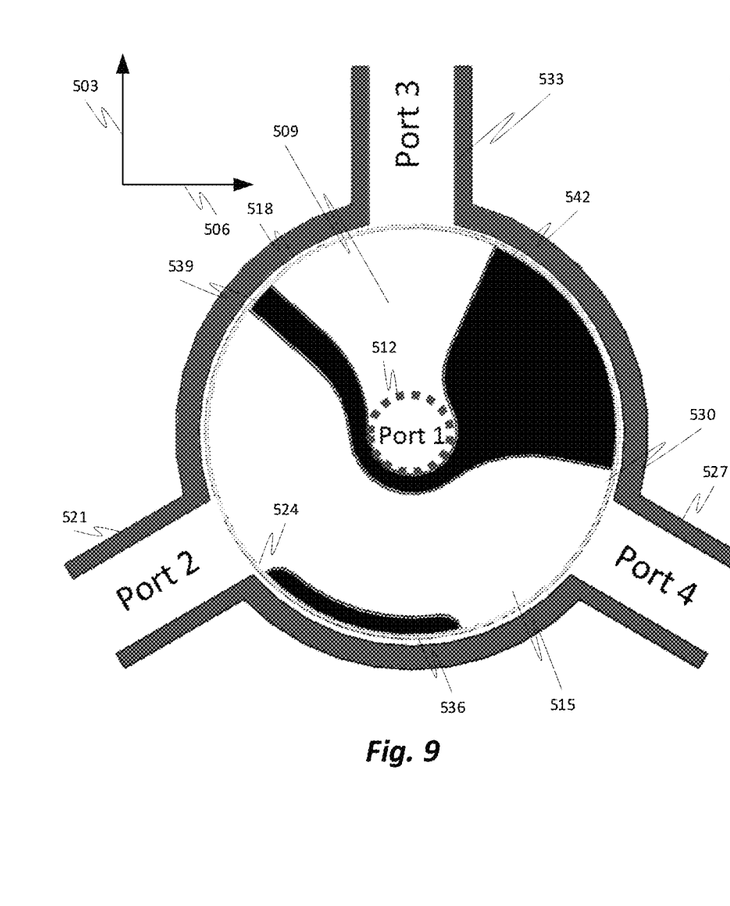

In the embodiment illustrated in FIG. 9, the inner rotatable rotor is aligned to a rotational position such that the first passageway 509 is positioned such that the gap 518 of the first passageway 509 is aligned with the third port 533 while the second passageway 515 is positioned such that the first gap 524 of the second passageway 515 is aligned with the third port 533 and the second gap 530 of the second passageway 515 is aligned with the fourth port 527. With the inner rotatable rotor in such a position, a flow between the first port 512 and the third port 533 through the first passageway 509 and a flow between the second port 521 and the fourth port 527 through the second passageway 515 may be achieved.

As illustrated in FIG. 4F, in a sixth mode 415, the first port may be connected to the third port and the second and fourth ports may be blocked. This configuration is illustrated in FIG. 10.

Figure 10:
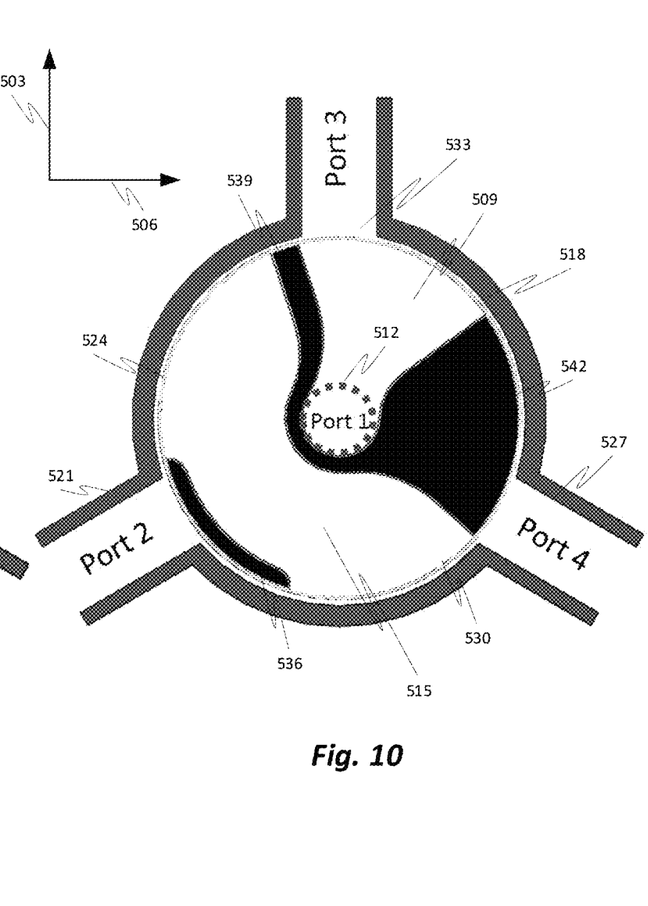

In the embodiment illustrated in FIG. 10, the inner rotatable rotor is aligned to a rotational position such that the first passageway 509 is positioned such that the gap 518 of the first passageway 509 is aligned with the third port 533 while the second passageway 515 is positioned such that the third port 533 is blocked by a blocking face 536 between the two gaps 527, 530 of the second passageway 515. With the inner rotatable rotor in such a position, a flow between the first port 512 and the third port 533 through the first passageway 509 is achieved while no flow is allowed to and from the second port 521 and fourth port 527.

Figure 4G:
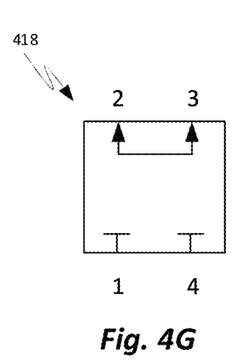

As illustrated in FIG. 4G, in a seventh mode 418, the second port may be connected to the third port and the first and fourth ports may be blocked. This configuration is illustrated in FIG. 11.

Figure 11:
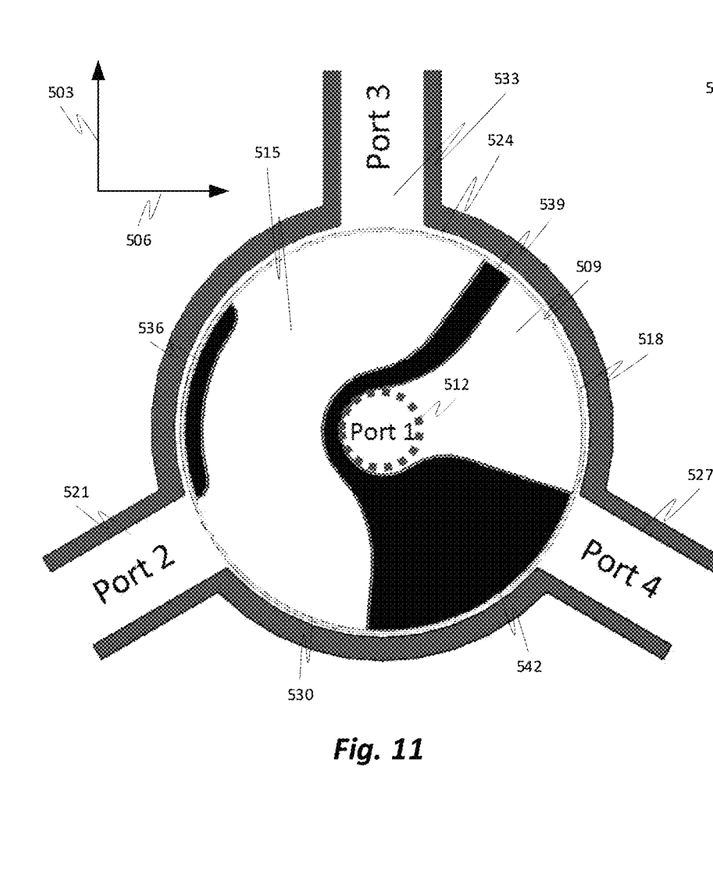

In the embodiment illustrated in FIG. 11, the inner rotatable rotor is aligned to a rotational position such that the first passageway 509 is positioned such that the gap 518 of the first passageway 509 is aligned with the inner wall of the valve between the third port 533 and the fourth port while the second passageway 515 is positioned such that the first gap 524 of the second passageway 515 is aligned with the second port 521 and the second gap 530 of the second passageway 515 is aligned with the third port 533. With the inner rotatable rotor in such a position, a flow to and from the first port 512 and to and from the fourth port 527 is blocked while flow between the second port 521 and the third port 533 through the second passageway 515 is achieved.

Figure 4H:
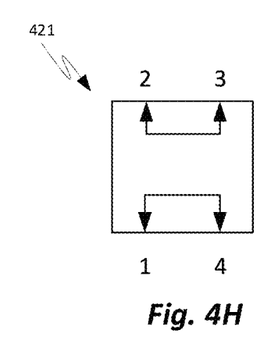

As illustrated in FIG. 4H, in an eighth mode 421, the first port may be connected to the fourth port and the second port may be connected to the third port. This configuration is illustrated in FIG. 12.

Figure 12:
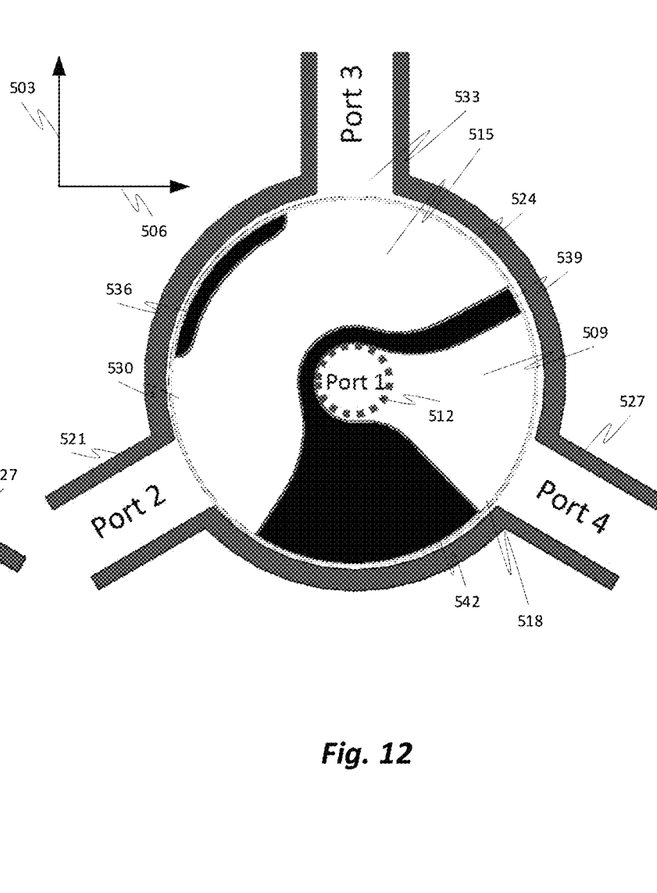

In the embodiment illustrated in FIG. 12, the inner rotatable rotor is aligned to a rotational position such that the first passageway 509 is positioned such that the gap 518 of the first passageway 509 is aligned with the fourth port 527 while the second passageway 515 is positioned such that the first gap 524 of the second passageway 515 is aligned with the second port 521 and the second gap 530 of the second passageway 515 is aligned with the third port 533. With the inner rotatable rotor in such a position, a flow between the first port 512 and the fourth port 527 through the first passageway 509 and a flow between the second port 521 and the third port 533 through the second passageway 515 may be achieved.

Figure 4I:
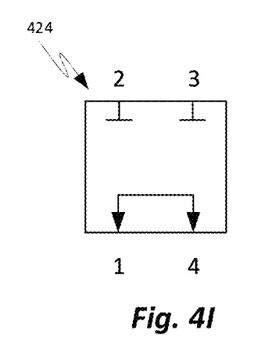

As illustrated in FIG. 4I, in a ninth mode 424, the first port may be connected to the fourth port and the second and third ports may be blocked. This configuration is illustrated in FIG. 13.

Figure 13:
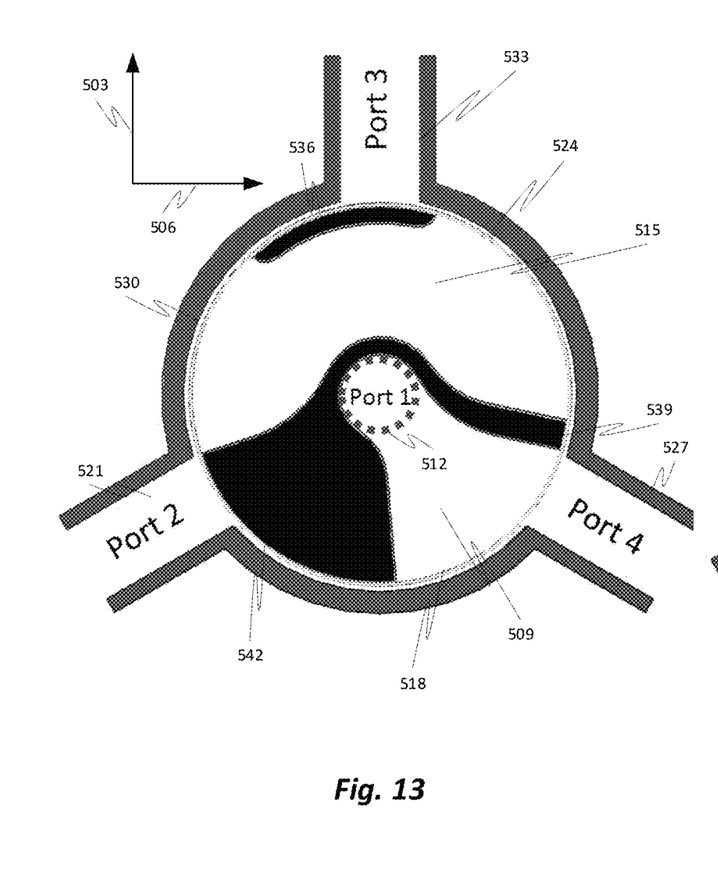

In the embodiment illustrated in FIG. 13, the inner rotatable rotor is aligned to a rotational position such that the first passageway 509 is positioned such that the gap 518 of the first passageway 509 is aligned with the fourth port 527 while the second passageway 515 is positioned such that the third port 533 is blocked by a blocking face 536 between the two gaps 524, 530 of the second passageway 515. With the inner rotatable rotor in such a position, a flow between the first port 512 and the fourth port 527 through the first passageway 509 is achieved while no flow is possible to and from the second port 521 and third port 533.

Figure 4J:
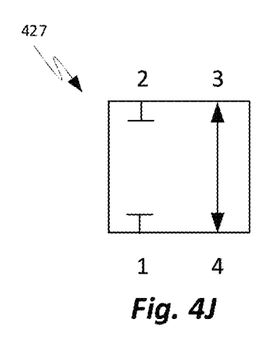

As illustrated in FIG. 4J, in a tenth mode 427, the first and second ports may be blocked while the third and fourth ports may be connected to allow the flow of fluid. This configuration is illustrated in FIG. 14.

Figure 14:
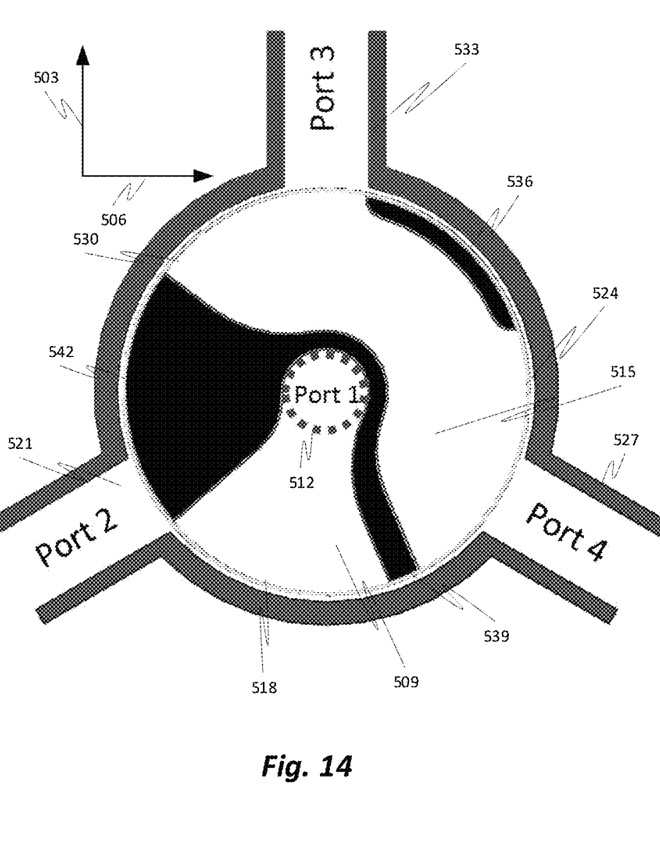

In the embodiment illustrated in FIG. 14, the inner rotatable rotor is aligned to a rotational position such that the first passageway 509 is positioned such that the gap 518 of the first passageway 509 is aligned with the inner wall of the valve between the second port 521 and the fourth port 527 while the second passageway 515 is positioned such that the first gap 524 of the second passageway 515 is aligned with the fourth port 527 and the second gap 530 of the second passageway 515 is aligned with the third port 533. With the inner rotatable rotor in such a position, a flow to and from the first port 512 and to and from the second port 521 is blocked while flow between the third port 533 and the fourth port 527 through the second passageway 515 is achieved.

As can be appreciated, a single rotary valve as described above may quickly switch between the ten modes by revolving the inner rotatable mechanism. The valve may operate to switch between modes at a virtually instantaneous rate. The valve may be capable of switching between parallel flows to cross-flows to a total shut-off to partial shut-off of flows depending on the rotational position of the inner rotatable mechanism.

Figure 15:
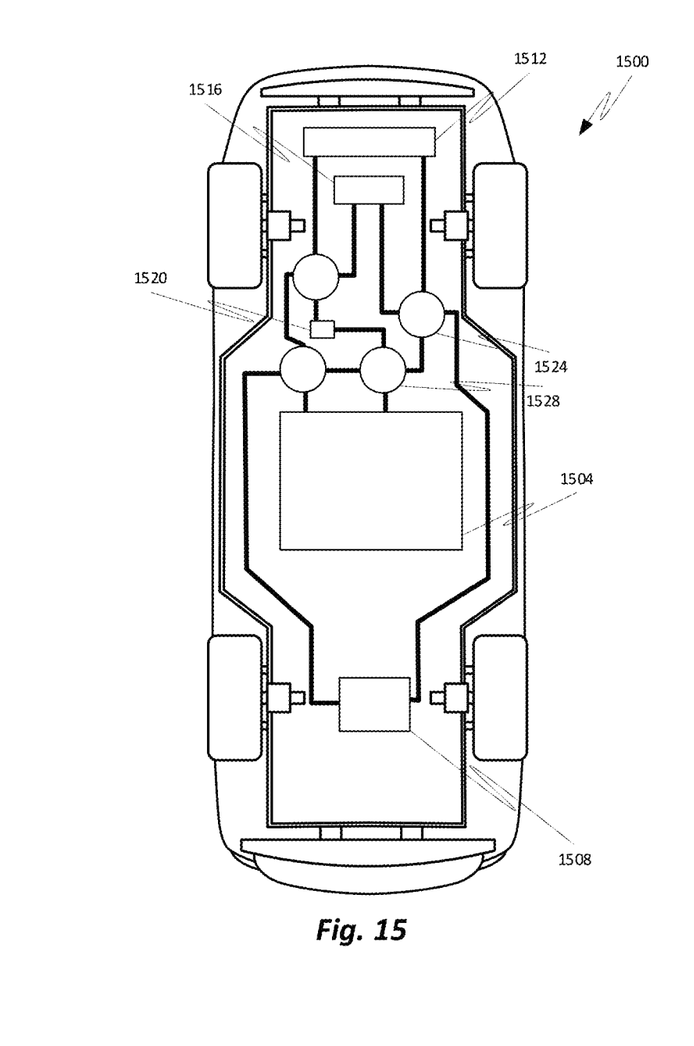
FIG. 15 is a block diagram showing a vehicle and network of valves in accordance with some embodiments of the invention.

As illustrated in FIG. 15, multiple valves as described herein may be used in conjunction with each other to achieve a great number of configurations. Such a network of valves may be used to distribute coolant or other fluids throughout a vehicle. As can be appreciated in FIG. 15, a vehicle 1500 may comprise a battery 1504, a traction inverter and motor 1508, a radiator 1512, a wireless charger pad and rectifier 1516, and a heater core 1520. For operation of the vehicle 1500, coolant may be needed to be pumped to and from each of such elements. At certain moments the coolant may be needed to be directed to different elements at different times. Using conventional valves, which are capable of fewer configurations as compared to the valve as disclosed herein, a large number of valves, connections, and tubes may be necessary to properly route coolant throughout the vehicle. With valves as described herein, however, the number of valves, connections, and tubes necessary to properly route coolant throughout the vehicle may be reduced.

For example, a first valve 1524 may comprise four ports. The four ports of the first valve 1524 may be connected to a radiator 1512, a wireless charger pad and rectifier 1516, a port of a second valve 1528, and a traction inverter and motor 1508. By controlling a rotational position of an inner rotatable mechanism of the first valve, coolant flowing between the radiator 1512, wireless charger pad and rectifier 1516, port of a second valve 1528, and traction inverter and motor 1508 may be directed. For instance, when the inner rotatable mechanism of the first valve is in a first position, as illustrated in FIG. 7, all flow between the elements may be shutoff. By slightly rotating the inner rotatable mechanism of the first valve to a second position, as illustrated in FIG. 8, flow between two of the elements, for example the traction inverter and motor and the radiator may be achieved while flow into and out of the other two ports remains shut off. By continuing to adjust the rotational position of the inner rotatable mechanism of the first valve, ten different modes may be achieved.

In some embodiments, a valve as described herein may be placed in a housing 1600 as illustrated in FIG. 16. The housing may have four ports 1603, 1606, 1609, 1612, allowing for fluid to pass into and out of the housing 1600 and to be directed by a valve, as described herein, within the housing 1600.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a valve, the valve comprising: a housing, the housing comprising first, second, third, and fourth flow ports, wherein the first flow port is at a location extending vertically from a center of the housing, and wherein the second, third, and fourth flow ports are at radially spaced apart locations extending horizontally from the center of the housing; and a rotor positioned within and rotatably movable within the cavity about a rotation axis, the rotor comprising: a first fluid passageway extending from a first opening, the first opening at a position extending from a center of the rotor to a second opening at a first outer radial position of the surface of the rotor; and a second fluid passageway extending through the rotor between third and fourth openings at second and third outer radial positions of the surface of the rotor.

Aspects of the above valve can include wherein the second, third, and fourth flow ports are spaced 120 degrees apart from each other.

Aspects of the above valve can include wherein the first flow port is spaced 90 degrees from each of the second, third, and fourth flow ports.

Aspects of the above valve can include wherein the first opening continuously connects to the first flow port.

Aspects of the above valve can include wherein the rotor further comprises two or more sealing faces.

Aspects of the above valve can include wherein the two or more sealing faces operable to seal one or more of the second, third, and fourth flow ports depending on a position of the rotor.

Aspects of the above valve can include wherein the second passageway surrounds a first sealing face of the two or more sealing faces.

Aspects of the above valve can include wherein the rotor is rotatably movable to one or more rotor positions.

Aspects of the above valve can include wherein in a first position of the one or more rotor positions: the first passageway allows for flow between the first flow port and one of the second, third, and fourth flow ports; and the second passageway allows for flow between the other two of the second, third, and fourth flow ports.

Aspects of the above valve can include wherein in a second position of the one or more rotor positions: the first passageway allows for flow between the first flow port and one of the second, third, and fourth flow ports; and one or more of the other two of the second, third, and fourth flow ports is blocked by a sealing face of the rotor.

Aspects of the above valve can include wherein in a third position of the one or more rotor positions: a sealing face of the rotor blocks flow to and from one of the second, third, and fourth flow ports; and the second passageway allows for flow between the other two of the second, third, and fourth flow ports.

Aspects of the above valve can include wherein in a fourth position of the one or more rotor positions: the first passageway is blocked by a wall of the housing between two of the second, third, and fourth flow ports, wherein flow to and from the first flow port is blocked; and two of the second, third, and fourth flow ports are each blocked by a separate sealing face of the rotor.

Embodiments include a system, comprising: a processor; a servomotor; and a valve, the valve comprising: a housing, the housing comprising first, second, third, and fourth flow ports, wherein the first flow port is at a location extending vertically from a center of the housing, and wherein the second, third, and fourth flow ports are at radially spaced apart locations extending horizontally from the center of the housing; and a rotor positioned within and rotatably movable within the cavity about a rotation axis, the rotor comprising: a first fluid passageway extending from a first opening, the first opening at a position extending from a center of the rotor to a second opening at a first outer radial position of the surface of the rotor; and a second fluid passageway extending through the rotor between third and fourth openings at second and third outer radial positions of the surface of the rotor.

Aspects of the above system can include wherein the second, third, and fourth flow ports are spaced 120 degrees apart from each other.

Aspects of the above system can include wherein the first flow port is spaced 90 degrees from each of the second, third, and fourth flow ports.

Aspects of the above system can include wherein the first opening continuously connects to the first flow port.

Aspects of the above system can include wherein the rotor further comprises two or more sealing faces.

Aspects of the above system can include wherein the two or more sealing faces operable to seal one or more of the second, third, and fourth flow ports depending on a position of the rotor.

Aspects of the above system can include wherein the second passageway surrounds a first sealing face of the two or more sealing faces.

Aspects of the above system can include wherein the rotor is rotatably movable to one or more rotor positions.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A valve comprising:
   a housing, the housing having a cavity and comprising first, second, third, and fourth flow ports in fluid communication with the cavity, wherein the first flow port is at a location extending vertically from a center of the housing and wherein the second, third, and fourth flow ports are at radially spaced apart locations extending horizontally from the center of the housing; and
   a rotatable rotor positioned within the cavity about a rotation axis, the rotor comprising:
      a first fluid passageway extending from a first opening, the first opening at a position extending from a center of the rotor to a second opening at a first outer radial position of the surface of the rotor;
      a second fluid passageway extending through the rotor between third and fourth openings at second and third outer radial positions of the surface of the rotor;
      a first sealing face; and
      a second sealing face,
   wherein in a first position:
      the first sealing face blocks flow to and from one of the second, third, and fourth flow ports, wherein no flow is possible to and from the first flow port; and
      the second passageway allows for flow between the other two of the second, third, and fourth flow ports.

2. The valve of claim 1, wherein the second, third, and fourth flow ports are spaced 120 degrees apart from each other.

3. The valve of claim 1, wherein the first flow port is spaced 90 degrees from each of the second, third, and fourth flow ports.

4. The valve of claim 1, wherein the first opening continuously connects to the first flow port.

5. The valve of claim 1, wherein the first and second sealing faces are operable to seal one or more of the second, third, and fourth flow ports depending on a position of the rotor.

6. The valve of claim 1, wherein the second passageway surrounds the first sealing face.

7. The valve of claim 1, wherein the rotor is rotatably movable to two or more rotor positions.

8. The valve of claim 7, wherein in a second position of the rotor positions:
the first passageway allows for flow between the first flow port and one of the second, third, and fourth flow ports; and
the second passageway allows for flow between the other two of the second, third, and fourth flow ports.

9. The valve of claim 7, wherein in a second position of the rotor positions:
the first passageway allows for flow between the first flow port and one of the second, third, and fourth flow ports; and
one or more of the other two of the second, third, and fourth flow ports is blocked by the first sealing face.

10. The valve of claim 7, wherein in a second position of the rotor positions:
the first passageway is blocked by a wall of the housing between two of the second, third, and fourth flow ports, wherein flow to and from the first flow port is blocked; and
two of the second, third, and fourth flow ports are each blocked by a separate sealing face of the rotor.

11. The valve of claim 1, wherein the rotor is rotatably movable to two or more rotor positions, wherein in a second position of the rotor positions the first passageway allows for flow between the first flow port and one of the second, third, and fourth flow ports.

12. A system, comprising:
a processor;
a servomotor; and
a valve comprising:
a housing, the housing comprising a cavity and first, second, third, and fourth flow ports, wherein each of the first, second, third, and fourth flow ports are in fluid communication with the cavity, wherein the first flow port is at a location extending vertically from a center of the housing, and wherein the second, third, and fourth flow ports are at radially spaced apart locations extending horizontally from the center of the housing; and
a rotor positioned within the cavity, the rotor being rotatable about a rotation axis and comprising:
a first fluid passageway extending from a first opening, the first opening at a position extending from a center of the rotor to a second opening at a first outer radial position of the surface of the rotor;
a second fluid passageway extending through the rotor between third and fourth openings at second and third outer radial positions of the surface of the rotor;
a first sealing face; and
a second sealing face,
wherein in a first position:
the first sealing face blocks flow to and from one of the second, third, and fourth flow ports, wherein no flow is possible to and from the first flow port; and
the second passageway allows for flow between the other two of the second, third, and fourth flow ports.

13. The system of claim 12, wherein the second, third, and fourth flow ports are spaced 120 degrees apart from each other.

14. The system of claim 12, wherein the first flow port is spaced 90 degrees from each of the second, third, and fourth flow ports.

15. The system of claim 12, wherein the first opening continuously connects to the first flow port.

16. The system of claim 12, wherein the first and second sealing faces are operable to seal one or more of the second, third, and fourth flow ports depending on a position of the rotor.

17. The system of claim 12, wherein the second passageway surrounds the first sealing face.

18. The system of claim 12, wherein the rotor is rotatably movable to two or more rotor positions.

19. The system of claim 18, wherein in a second position of the rotor positions:
the first passageway allows for flow between the first flow port and one of the second, third, and fourth flow ports; and
the second passageway allows for flow between the other two of the second, third, and fourth flow ports.

20. The system of claim 12, wherein the rotor is rotatably movable to two or more rotor positions, wherein in a second position of the rotor positions the first passageway allows for flow between the first flow port and one of the second, third, and fourth flow ports.

* * * * *